(12) United States Patent
Ross et al.

(10) Patent No.: US 8,661,079 B2
(45) Date of Patent: Feb. 25, 2014

(54) METHOD AND APPARATUS FOR ESTABLISHING AN INVITE-FIRST COMMUNICATION SESSION

(75) Inventors: David Jonathan Ross, San Diego, CA (US); Ravinder Chandhok, San Diego, CA (US); Gil Balaoing, SanDiego, CA (US); Eric C. Rosen, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2651 days.

(21) Appl. No.: 10/371,338

(22) Filed: Feb. 20, 2003

(65) Prior Publication Data

US 2004/0187109 A1  Sep. 23, 2004

(51) Int. Cl.
*G06F 15/16* (2006.01)

(52) U.S. Cl.
USPC .......... 709/204; 709/227; 718/100; 455/509; 455/511

(58) Field of Classification Search
USPC .............. 709/227; 718/100; 455/509, 511
See application file for complete search history.

(56) References Cited

U.S. PATENT DOCUMENTS

| | | | |
|---|---|---|---|
| 5,706,211 A | 1/1998 | Beletic et al. | 364/514 R |
| 6,477,150 B1 | 11/2002 | Maggenti et al. | |
| 6,564,261 B1 * | 5/2003 | Gudjonsson et al. | 709/227 |
| 6,865,398 B2 * | 3/2005 | Mangal et al. | 455/552.1 |
| 6,941,345 B1 * | 9/2005 | Kapil et al. | 709/206 |
| 6,996,083 B1 * | 2/2006 | Balachandran et al. | 370/337 |
| 6,996,414 B2 | 2/2006 | Vishwanathan et al. | |
| 7,603,126 B2 | 10/2009 | Rosen et al. | |

(Continued)

FOREIGN PATENT DOCUMENTS

| | | |
|---|---|---|
| JP | 774669 | 3/1995 |
| WO | 0141416 A2 | 6/2001 |
| WO | 0209448 A2 | 1/2002 |
| WO | 0232165 A1 | 4/2002 |

OTHER PUBLICATIONS

International Search Report-PCT/US2004/005099, International Searching Authority/US-Alexandria, Virginia-Nov. 30, 2005.
Written Opinion-PCT/US2004/005099, International Searching Authority/US-Alexandria, Virginia-Nov. 30, 2005.

(Continued)

*Primary Examiner* — Thuong Nguyen
(74) *Attorney, Agent, or Firm* — Abdollah Katbab; Raphael Freiwirth

(57) ABSTRACT

The disclosed embodiments provide methods and apparatus for establishing an invite-first communication session in a wireless communication network. The method includes receiving an invite message from an inviter, forwarding the invite message to at least one invitee, receiving a response from one of the at least one invitee in response to the invite message, and establishing the communication session between the inviter and the at least one invitee.

72 Claims, 6 Drawing Sheets

(56) References Cited

U.S. PATENT DOCUMENTS

| | | |
|---|---|---|
| 2001/0006889 A1 | 7/2001 | Kraft .............................. 455/412 |
| 2001/0047294 A1 | 11/2001 | Rothschild ...................... 705/14 |
| 2002/0037723 A1 | 3/2002 | Roach |
| 2002/0068545 A1 | 6/2002 | Oyama et al. |
| 2002/0145990 A1* | 10/2002 | Sayeedi ......................... 370/335 |
| 2002/0169540 A1 | 11/2002 | Engstrom ..................... 701/200 |
| 2002/0172165 A1 | 11/2002 | Rosen et al. |
| 2002/0174248 A1 | 11/2002 | Morriss ......................... 709/238 |
| 2003/0012149 A1 | 1/2003 | Maggenti et al. |
| 2003/0222907 A1* | 12/2003 | Heikes et al. .................. 345/745 |
| 2004/0157590 A1* | 8/2004 | Lazaridis et al. .............. 455/415 |

OTHER PUBLICATIONS

International Preliminary Report on Patentability-PCT/US2004/005099, International Preliminary Examining Authority/US-Alexandria, Virginia-Aug. 24, 2006.

Supplementary European Search Report—EP04713327, Search Authority—Munich Patent Office, Dec. 16, 2008.

* cited by examiner

METHOD AND APPARATUS FOR ESTABLISHING AN INVITE-FIRST COMMUNICATION SESSION

FIELD

The present invention relates to point to point or point to multi-point communications systems. More specifically, the present invention relates to methods and apparatus for first inviting a single or a group of target users before establishing a communication session in a wireless communication network.

BACKGROUND

When the packet data service in a wireless communications system is active, resources in the infrastructure, e.g., base station transceiver subsystem (BTS), base station controller (BSC), packet control function (PCF), and the radio link are actively assigned to the participating communication devices. After a period of inactivity in a communication device, the corresponding traffic channel may transition to a dormant packet data session to conserve system capacity, reduce service cost, and save battery life. However, the act of transitioning the dormant packet data session back to an active packet data session is accompanied by a considerable delay in the system response. Existing wireless communication infrastructures provide limited opportunities for significantly reducing the latency in waking up a dormant packet data session, i.e., it is not possible to reduce the actual latency below the time that is required to re-establish the traffic channel for the dormant packet-data session.

For example, a class of wireless services intended for quick, efficient, one-to-one or one-to-many (group) communication has existed in various forms for many years. In general, these services have been half-duplex, where a user presses a "push-to-talk" (PTT) button on a phone/radio to initiate a group communication. If granted the floor, the talker then generally speaks for a few seconds. After the talker releases the PTT button, other users who are available may request the floor. These services have traditionally been used in applications where one person, a "dispatcher," needs to communicate with a group of people, such as field service personnel or taxi drivers, which is where the "dispatch" name for the service comes from. Similar services have been offered on the Internet and are generally known as "voice chat."

A key feature of these services is that communication is quick and spontaneous, usually initiated by simply pressing a PTT button, without going through a typical dialing and ringing sequence. Communication in this type of service is generally very short, with individual talk "spurts" being generally on the order of several seconds, and "conversations" lasting possibly a minute or less. The time delay between when the user requests the floor and when the user receives a positive or negative confirmation from a group communication server indicating that the user has the floor and may begin speaking is known as PTT latency.

PTT latency is a critical parameter for half-duplex group communications systems. As mentioned previously, dispatch services place a priority on short, quick conversations, which makes the service less attractive if PTT latency becomes large.

There is a need, therefore, for mechanisms to reduce the effect of PTT latency as perceived by the talker and to make the talker to attribute the undesirable system latency to the target users rather than to the system or the service provider.

SUMMARY

The disclosed embodiments provide novel and improved methods and apparatus for establishing an invite-first communication session in a wireless communication network. The method includes receiving an invite message from an inviter, forwarding the invite message to at least one invitee, receiving a response from one of the at least one invitee in response to the invite message, and establishing a communication session between the inviter and the at least one invitee.

In another aspect, a method for establishing an invite-first communication session in a wireless communication network includes receiving an input from an inviter who wishes to invite at least one invitee, forwarding an invite message to the at least one invitee, receiving a response from one of the at least one invitee in response to the invite message, and establishing a communication session between the inviter and the at least one invitee.

In one aspect, an apparatus for establishing an invite-first communication session in a wireless communication network includes a memory unit, a receiver, a transmitter, and a processor communicatively coupled with the memory unit, the receiver, and the transmitter. The processor is capable of carrying out the above-mentioned methods.

BRIEF DESCRIPTION OF THE DRAWINGS

The features and advantages of the present invention will become more apparent from the detailed description of the embodiments set forth below.

DETAILED DESCRIPTION

Figure 1:
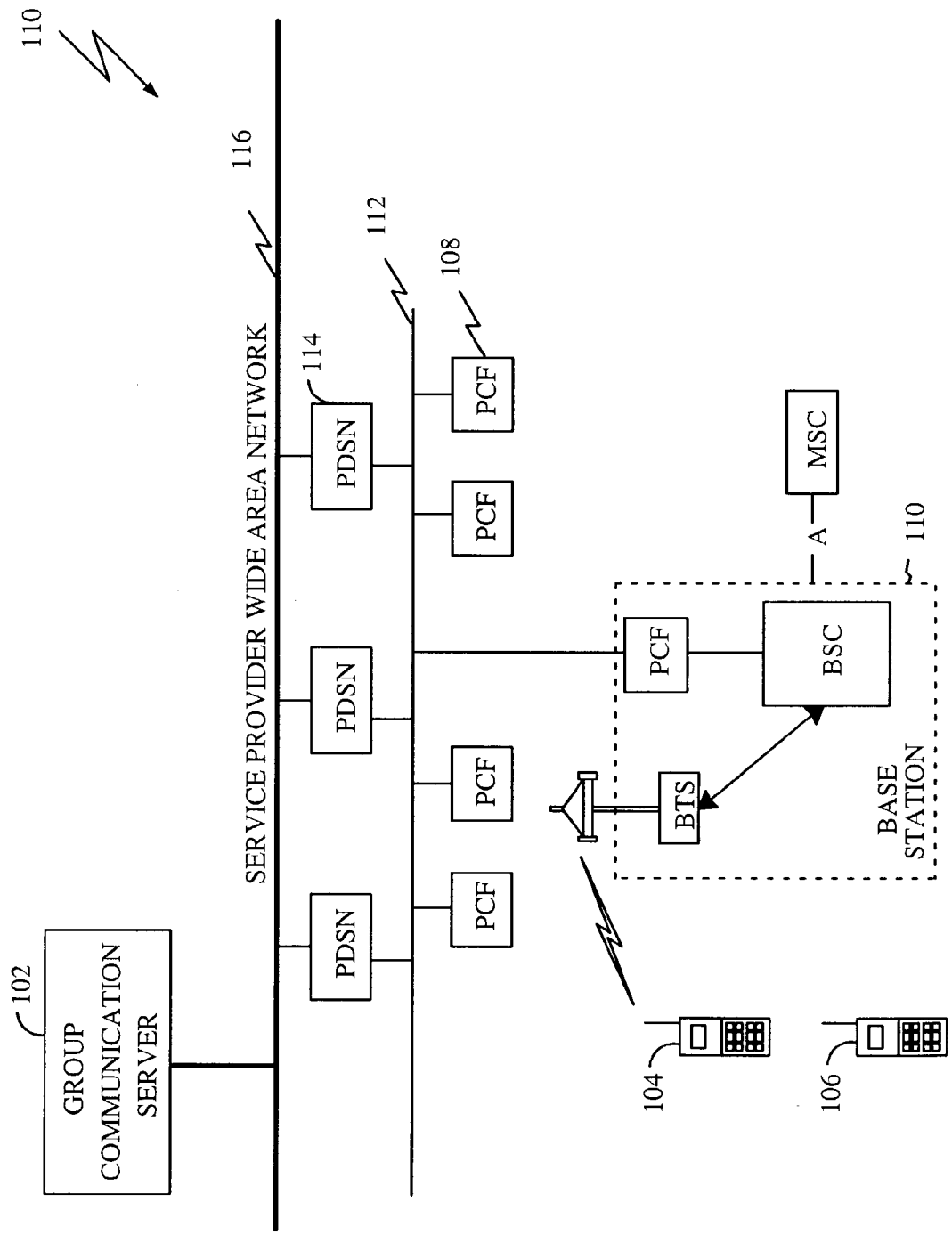
FIG. 1 illustrates a group communications system.

Before several embodiments are explained in detail, it is to be understood that the scope of the invention should not be limited to the details of the construction and the arrangement of the components set forth in the following description or illustrated in the drawings. Also, it is to be understood that the phraseology and terminology used herein is for the purpose of description and should not be regarded as limiting.

FIG. 1 illustrates a functional block diagram of a group communication system 100, for implementing one embodiment. Group communication system 100 is also known as a push-to-talk (PTT) system, a net broadcast service (NBS), a dispatch system, or a point-to-multi-point communication system. In one embodiment, group communication system 100 includes a group communication server 102, which may be deployed in either a centralized deployment or a regionalized deployment.

Group communication devices (CDs) 104 and 106, which may be deployed such as cdma2000 handset, for example, may request packet data sessions using a data service option. Each CD may use the session to register its Internet Protocol (IP) address with the group communication server to perform group communication initiations. In one embodiment, group communication server 102 is connected to the service provider's packet data service nodes (PDSNs) through service provider's network 116. CDs 104 and 106, upon requesting packet data sessions from the wireless infrastructure, may have IP connectivity to group communication server 102 through the PDSNs 114. Each PDSN may interface to a base station controller (BSC) through a packet control function (PCF) 108 and a network 112. The PCF may be co-located with the BSC within a base station (BS) 110.

A packet data service node may fall in one of several states, e.g., active or connected state, dormant state, and null or inactive state. In the active or connected state, a active traffic channel exists between the participating CD and the BS or BSC, and either side may send data. In the dormant state, no active traffic channel exists between the participating CD and the BSC, but a point-to-point protocol (PPP) link is maintained between the participating CD and the PDSN. In the null or inactive state, there is no active traffic channel between the participating CD and the BSC, and no PPP link is maintained between the participating CD and the PDSN.

After powering up, CDs 104 and 106 may request packet data sessions. As part of establishing a packet data session, each CD may be assigned an IP address. Each CD may perform a registration process to notify group communication server 102 of the CD's IP address. Registration may be performed using an IP protocol, such as session initiation protocol (SIP) over user datagram protocol (UDP). The IP address of a CD may be used to contact the CD when the corresponding user is invited into a group communication.

Once a group communication is established, CDs 104 and 106 and group communication server 102 may exchange media and signaling messages. In one embodiment, media may be exchanged between the participating CDs and the group communication server by using real-time protocol (RTP) over UDP. The signaling messages may also be exchanged by using a signaling protocol over UDP.

Group communication system 100 performs several different functions in order to operate group communication services. The functions that relate to the user side include user registration, group communication initiation, group communication termination, sending alerts to group participants, late join to a group communication, talker arbitration, adding members to a group, removing members from a group, unregistering a member, and authentication. The functions that relate to system preparation and operation include administration and provisioning, scalability, and reliability. These functions are described in detail in the copending patent application entitled, "A Communication Device for Defining a Group in a Group Communication Network," U.S. patent application Ser. No. 10/076,726, filed Feb. 14, 2002, which is assigned to the same assignee and incorporated herein by reference in its entirety.

Figure 2:
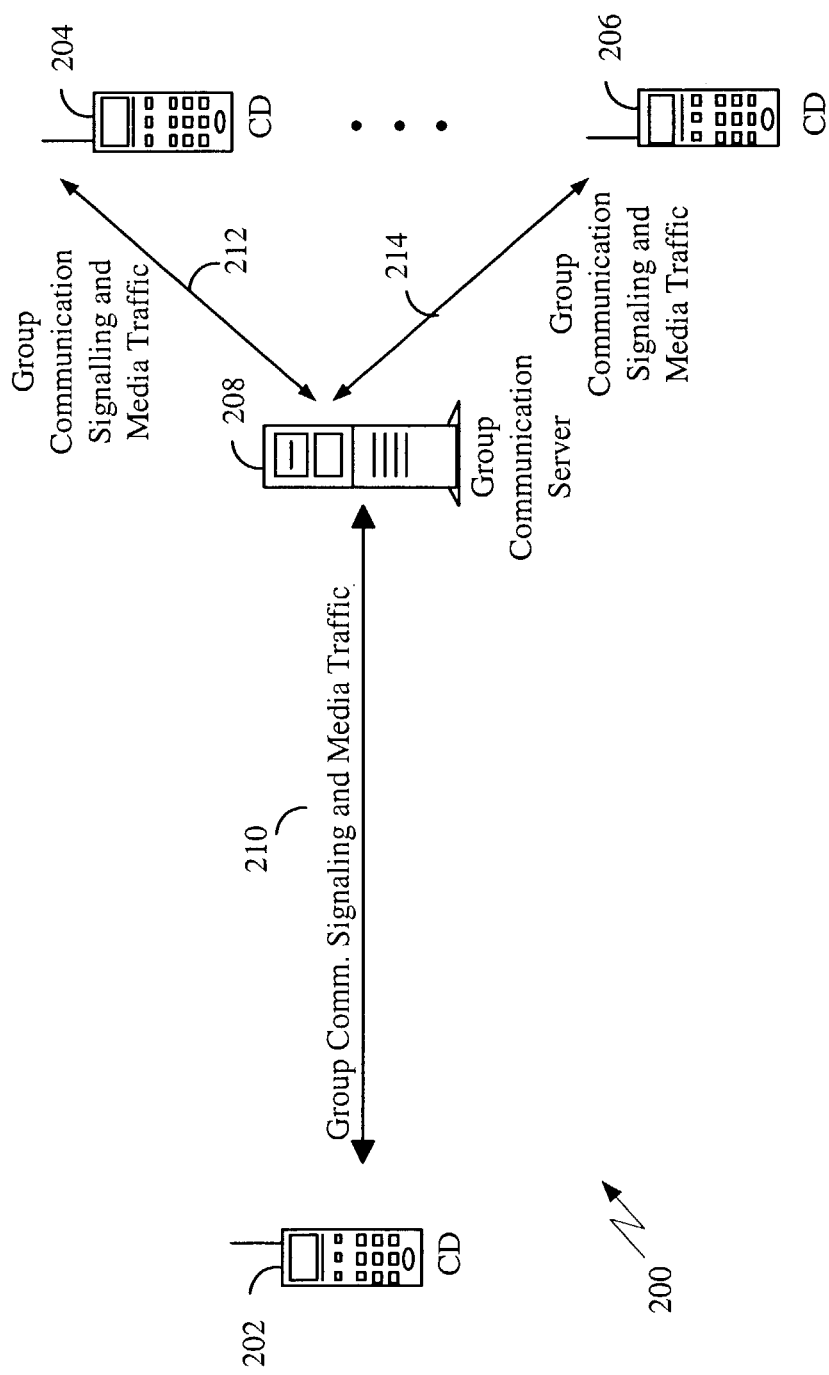
FIG. 2 illustrates how several communication devices interact with a group communication server.

FIG. 2 illustrates a group communication arrangement 200 for showing how CDs 202, 204, and 206 interact with a group communication server 208. Multiple group communication servers may be deployed as desired for large-scale groups. A user may input her desire to a CD 202, 204, 206 to initiate a communication session for exchanging communication media, e.g., data, voice, image, and/or video, with one or more CDs. In one embodiment, the user may first invite the target users(s) before starting to communicate media, by pushing an "invite" or a PTT button on a CD.

In FIG. 2, when CD 202 has permission to transmit media to other members of the group, CD 202 is known as the talker and may transmit media over an established channel. When CD 202 is designated as the talker, the remaining participants, CD 204 and CD 206, may not be permitted to transmit media to the group. Accordingly, CD 204 and CD 206 are designated as listeners. As described above, CDs 202, 204, and 206 are connected to group communication server 208, using at least one channel. In one embodiment, channels 210, 212, and 214 may include a session initiation protocol (SIP) channel, a media-signaling channel, and a media traffic channel.

Figure 3:
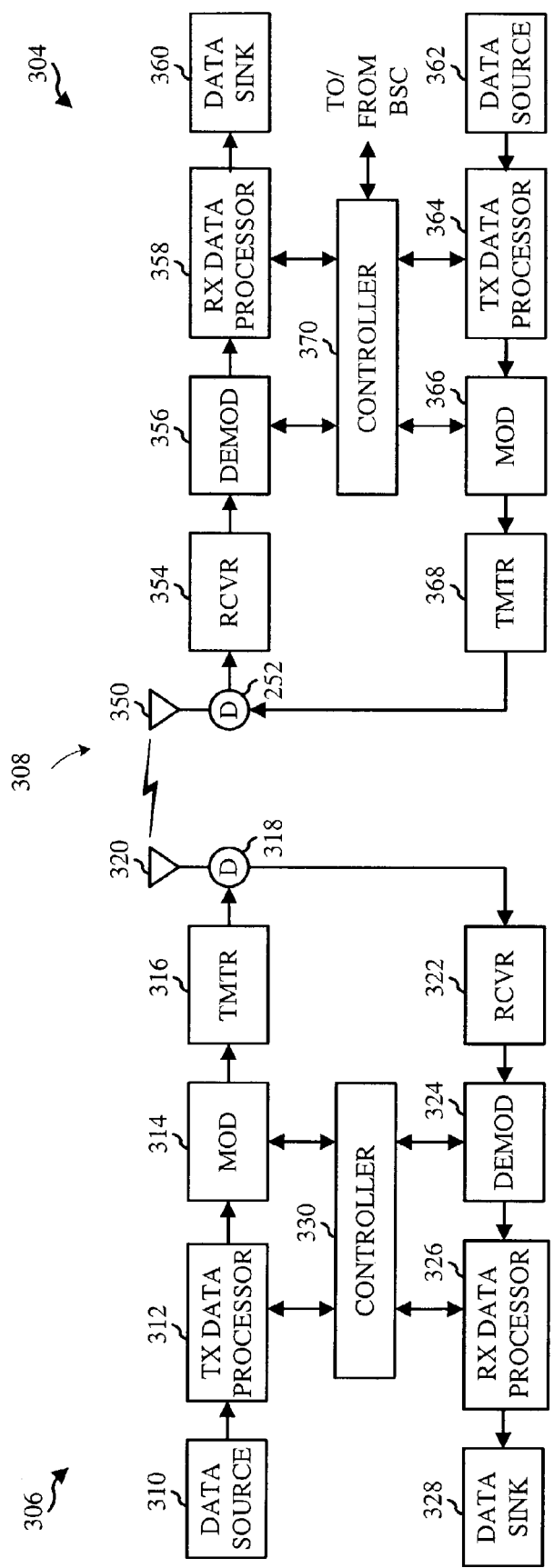
FIG. 3 illustrates on embodiment for implementing a wireless communications infrastructure.

FIG. 3 is a simplified block diagram of an embodiment of a base station/base station controller (BS/BSC) 304 and a communication device 306, which are capable of implementing various disclosed embodiments. For a particular communication, voice, data, packet data, and/or messages may be exchanged between BS/BSC 304 and communication device 306, via an air interface 308. Various types of messages may be transmitted, such as messages used to establish a communication session between the base station and the communication device, registration and paging messages, and messages used to control a data transmission (e.g., power control, data rate information, acknowledgment, and so on). Some of these message types are described in further detail below.

For the reverse link, at communication device 306, voice and/or packet data (e.g., from a data source 310) and messages (e.g., from a controller 330) are provided to a transmit (TX) data processor 312, which formats and encodes the data and messages with one or more coding schemes to generate coded data. Each coding scheme may include any combination of cyclic redundancy check (CRC), convolutional, turbo, block, and other coding, or no coding at all. The voice, packet data, and messages may be coded using different schemes, and different types of messages may be coded differently.

The coded data is then provided to a modulator (MOD) 314 and further processed (e.g., covered, spread with short PN sequences, and scrambled with a long PN sequence assigned to the user terminal). The modulated data is then provided to a transmitter unit (TMTR) 316 and conditioned (e.g., converted to one or more analog signals, amplified, filtered, and quadrature modulated) to generate a reverse link signal. The reverse link signal is routed through a duplexer (D) 318 and transmitted via an antenna 320 to BS/BSC 304.

At BS/BSC 304, the reverse link signal is received by an antenna 350, routed through a duplexer 352, and provided to a receiver unit (RCVR) 354. Alternatively, the antenna may be part of the wireless operator network, and the connection between the antenna and the BS/BSC may be routed through the Internet. BS/BSC 304 may receive media information and invite messages from remote access device 306. Receiver unit 354 conditions (e.g., filters, amplifies, down converts, and digitizes) the received signal and provides samples. A demodulator (DEMOD) 356 receives and processes (e.g., despreads, decovers, and pilot demodulates) the samples to provide recovered symbols. Demodulator 356 may implement a rake receiver that processes multiple instances of the received signal and generates combined symbols. A receive (RX) data processor 358 then decodes the symbols to recover the data and messages transmitted on the reverse link. The recovered voice/packet data is provided to a data sink 360 and the recovered messages may be provided to a controller 370. Controller 370 may include instructions for receiving and sending information, receiving and sending invite messages, receiving and sending responses to invite messages, sending information, measuring time between sending an invite message and receiving a response to the invite message, transforming information from one format to another, encrypting and/or decrypting information, and compressing and/or decompressing information. The processing by demodulator 356 and RX data processor 358 are complementary to that performed at remote access device 306. Demodulator 356 and RX data processor 358 may further be operated to process multiple transmissions received via multiple channels, e.g., a reverse fundamental channel (R-FCH) and a reverse supplemental channel (R-SCH). Also, transmissions may be simultaneously from multiple mobile stations, each of which may be transmitting on a reverse fundamental channel, a reverse supplemental channel, or both.

On the forward link, at BS/BSC 304, voice and/or packet data (e.g., from a data source 362) and messages (e.g., from controller 370) are processed (e.g., formatted and encoded) by a transmit (TX) data processor 364, further processed (e.g., covered and spread) by a modulator (MOD) 366, and conditioned (e.g., converted to analog signals, amplified, filtered, and quadrature modulated) by a transmitter unit (TMTR) 368 to generate a forward link signal. The forward link signal is routed through duplexer 352 and transmitted via antenna 350 to remote access device 306. Forward link signals include paging signals.

At communication device 306, the forward link signal is received by antenna 320, routed through duplexer 318, and provided to a receiver unit 322. Receiver unit 322 conditions (e.g., down converts, filters, amplifies, quadrature modulates, and digitizes) the received signal and provides samples. The samples are processed (e.g., despreaded, decovered, and pilot demodulated) by a demodulator 324 to provide symbols, and the symbols are further processed (e.g., decoded and checked) by a receive data processor 326 to recover the data and messages transmitted on the forward link. The recovered data is provided to a data sink 328, and the recovered messages may be provided to controller 330. Controller 330 may include instructions for receiving and sending information, receiving and sending invite messages, receiving and sending responses to invite messages, sending information, measuring time between sending an invite message and receiving a response to the invite message, transforming information from one format to another, encrypting and/or decrypting information, and compressing and/or decompressing information.

Figure 4:
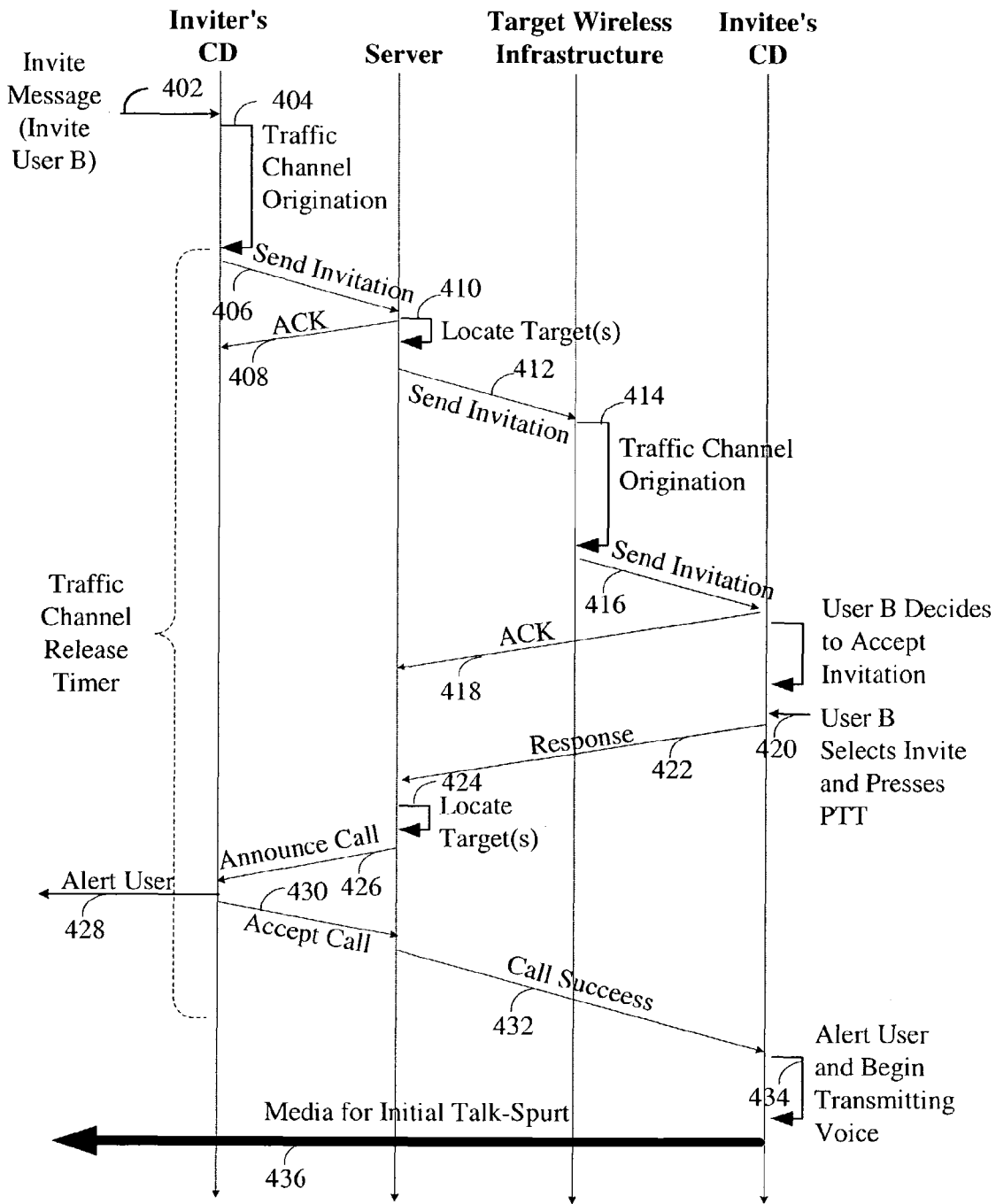
FIG. 4 illustrates a first invite-first call setup process.

FIG. 4 illustrates a message-flow diagram showing a process for setting up an invite-first communication session, according to one embodiment. A user may set up a communication session for communicating information, such as data, voice, image, and/or video, to a single or a group of target users. The user who wishes to initiate the communication session may select one or more target users, one or more pre-defined groups of target users, or a combination of the two, and may press a button, such as a push-to-talk (PTT) button, on a CD. The user may start delivering information after pressing the PTT button. Alternatively, the user may wait until a communication session is established, as the user's CD may be in a dormant packet data session when the user initiates the communication session.

Alternatively, the user may prefer to first invite the target user(s). After at least one target user has accepted the invitation, the inviter may start providing information. The invitation delivered to the target user(s) may include an expiration time for accepting the invitation. After the expiration time has reached, even if a target user accepts the invitation, no communication session may be established, according to one embodiment. The inviter and/or the invitee(s) may be notified accordingly.

Referring to FIG. 4, after the inviter's CD receives the invite message in step 402, the inviter's CD sends the invite message to a server for distribution to the target invitee(s). The inviter's CD sends the invite message regardless of whether the inviter's CD has a dedicated traffic channel established or not, as will be discussed in more detail later herein.

If the inviter's CD is in dormant packet data session, the inviter's CD may initiate the process of re-establishing its dedicated traffic channel and prepare the packet data session for media activity, in step 404, before sending the invite message to the server, in step 406. The server may send an acknowledge (ACK) message to the inviter or the inviter's CD, in step 408, indicating that the invite message is successfully delivered to the server.

Alternatively, when the inviter's CD is in dormant packet data session, the inviter's CD may forward the invite message to the server on a common channel, in step 406, without waiting for re-establishing its dedicated traffic channel. The inviter's CD may forward the invite message to the server, in step 406, in short data burst (SDB) format, as discussed in more detail in the following.

When the server receives the invite message, the server expands the pre-defined groups of target user(s), if any is specified in the received inviter message, into a list of group members. The server retrieves location information for the target invitee(s), in step 410. After the server locates at least one of the target invitee, the server sends the invite message to the target invitee's wireless infrastructure, in step 412.

The server sends the invite message to an invitee regardless of whether the invitee has an established dedicated traffic channel, as will be discussed in more detail later herein. If the invitee is in dormant packet data session, the wireless infrastructure may initiate the process of re-establishing invitee's dedicated traffic channel and prepare packet data sessions for media activity, in step 414, before sending the invite message to the invitee, in step 416. When at least one target invitee receives the invite message, the invitee's CD may send an acknowledge (ACK) message to the sever, in step 418, indicating that the invite message is successfully delivered to at least one invitee.

Alternatively, when the invitee's CD is in dormant packet data session, the server may forward the invite message to the invitee's CD on a common channel, in step 416, without waiting for re-establishing a dedicated traffic channel. The server may forward the invite message to the invitees'CDs, in step 416, in short data burst (SDB) format, as discussed in more detail in the following.

When at least one invitee, who has received the invite message, selects the invitation to communicate with the inviter, the inviter may press a PTT button on her CD to respond to the inviter, in step 420. The invitee's CD sends the inyitee's response, in step 422, to the server, on a dedicated channel or a common channel as discussed above. After the server locates the inviter's CD, in step 424, the server may send an announcement to the inviter's CD, in step 426, indicating that at least one invitee has accepted the invitation.

Assuming that an invitee's response reaches the inviter's CD before the inviter's traffic channel is released, or the expiration time specified in the invite message to respond to the invitation expires, the inviter's CD sends an alert message to the inviter, in step 428, indicating that her invitation is accepted. The alert message may include audio and/or tactile signals. If the inviter still wishes to continue with her communication with the invitee(s), the inviter may provide an input accordingly, e.g., by pressing a PTT button on her CD.

The inviter's acceptance is relayed back to the server, in step 430, and the communication success is relayed to the invitee's CD, in step 432. The invitee's CD may alert the invitee, in step 434, that the inviter is online and the communication session is established between the inviter and the invitee, in step 436. The rest of the invitees(s) in the target group of invitees may choose to join the ongoing communication session, by going through steps 422 through 434, as discussed above, according to one embodiment.

Figure 5:
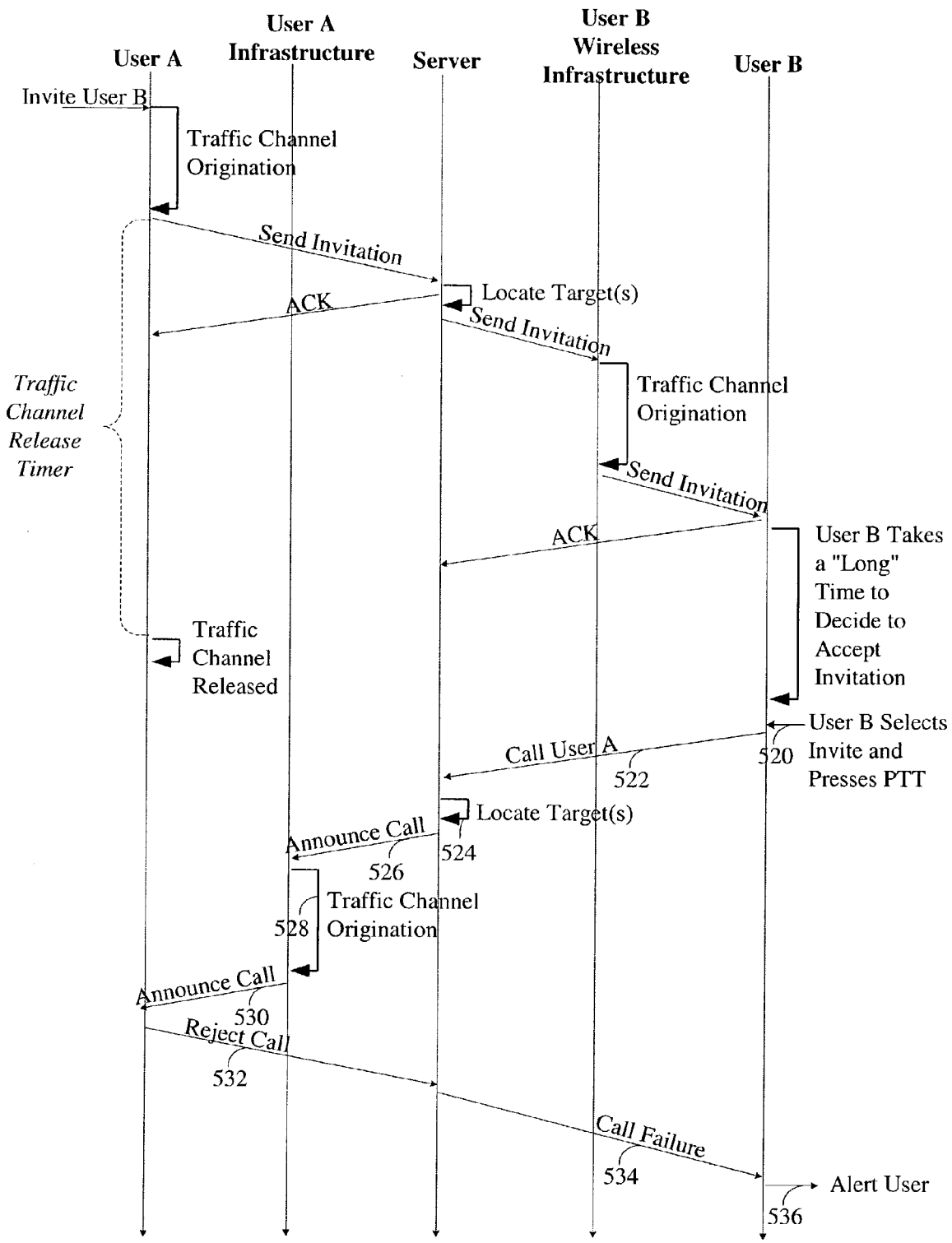
FIG. 5 illustrates a second invite-first call setup process.

FIG. 5 illustrates a message-flow diagram showing a process for setting up an invite-first communication-session, according to one embodiment. When it takes some period of time for the first invitee to accept the invite message, in step 520, the invitee's response reaches the inviter's wireless infrastructure, in step 526, after the inviter's traffic channel is released, or the expiration time specified in the invite message to respond to the invitation is reached, the inviter's infrastructure re-establishes a traffic channel for the inviter's CD, in step 528, and then sends the invitee's response to the inviter's CD, in step 530. Alternatively, the inviter's wireless infrastructure may send the invitee's response to the inviter's CD on a common channel in short data burst form, without waiting for a traffic channel to be re-established.

The inviter's CD may send an alert message, which may include audio and/or tactile signals, or a message such as a "missed call" to the inviter. If the inviter does not wish to continue with her communication with the invitee, the inviter's rejection is relayed back to the server, in step 532, and the communication failure is relayed to the invitee's CD, in step 534. The invitee's CD may alert the invitee, in step 536, that the inviter has withdrawn her invitation, and hence the call has failed. The invitee may initiate an invitation directed to the original inviter to establish a communication session, which other members of the invitee group may choose to join.

Figure 6:
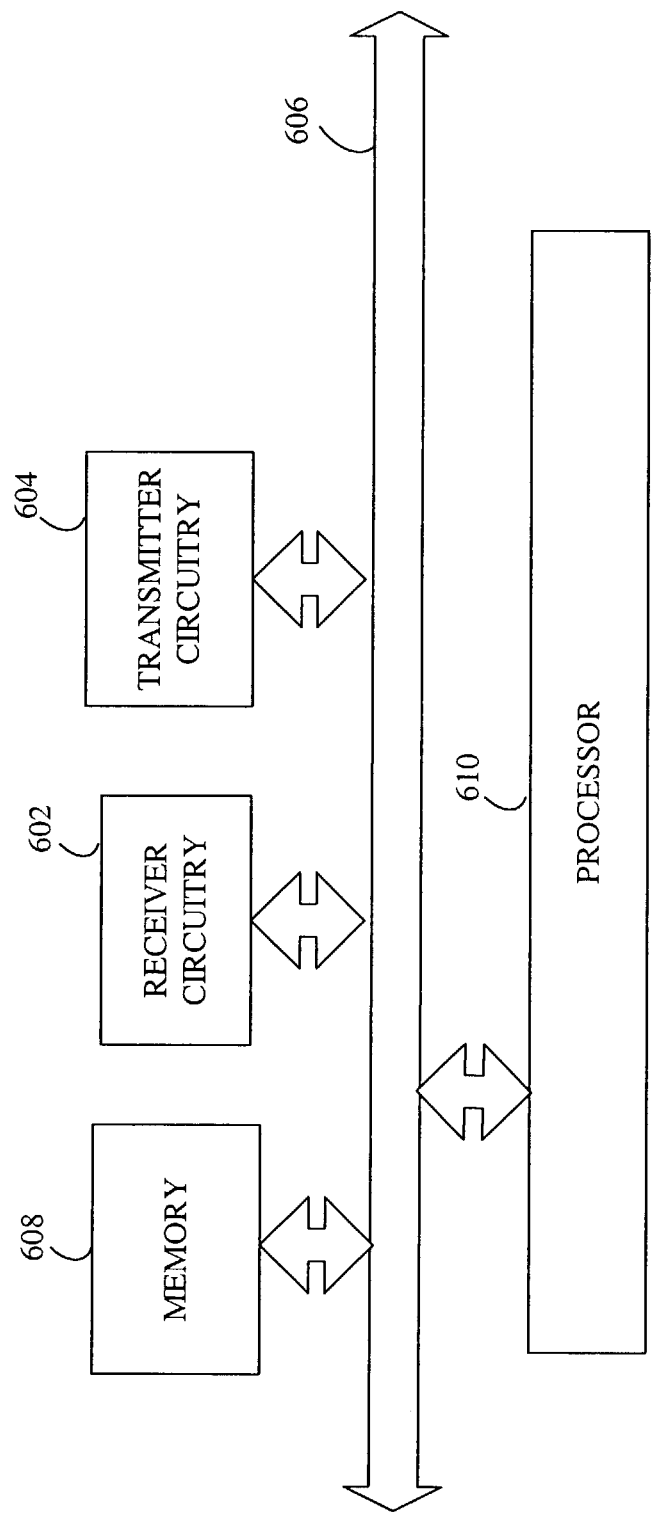
FIG. 6 illustrates one embodiment for the group call server operating in FIG. 1.

FIG. 6 illustrates one embodiment for the group call server 102 operating in system of FIG. 1. The group call server includes a receiver circuitry 602 and a transmit circuitry 604. Communication bus 606 provides a common connection among other modules in FIG. 6. Communication bus 606 is further coupled to memory unit 608. Memory unit 608 stores computer readable instructions for a variety of operations and functions performed by the group call server. The processor 610 performs the instructions stored in memory unit 608.

In one embodiment, group communication system 100 (FIG. 1) supports both chat-room and ad-hoc models for group communication. In the chat-room model, groups are predefined, which may be stored on the group communication server. The predefined groups, or nets, may be public, implying that the group has an open member list. In this case, each group member is a potential participant in a group communication. The group communication is started when a first group member starts to initiate a group communication. The call remains running for a pre-determined time period, which may be configured by the service provider. During a group communication, the group members may specifically request to join or leave the call. During periods of talk inactivity, the group communication may be brought into a group dormant state until a group member requests permission to talk. When operating in the chat-room model, group members, also known as net members, communicate with one another using a communication device assigned to each net member. The term "net" denotes a group of members authorized to communicate with each other.

In the ad-hoc model of group communication, however, groups may be defined in real-time and have a closed member list associated with each group. A closed member list may specify which members are allowed to participate in the group communication. The member list may not be available to others outside of the closed member list, and may only exist for the life of the call. Ad-hoc group definitions may not be stored in the group communication server. The definitions may be used to establish the group communication and released after the call has ended. An ad-hoc group may be formed when a caller selects one or more target members and generates a group communication request, which is sent to the group communication server to start the call. The group communication server may send a notification to the target group members that they have been included in the group. The group communication server may automatically join the target members into the group communication, i.e., no action may be required from the target members. When an ad-hoc call becomes inactive, the group communication server may "tear down" the call and free the resources assigned to the group, including the group definition used to start the call.

PTT Latency

To reduce PTT latency, the group communication signaling, such as invite messages and/or responses, floor-control requests, floor-control announcements, and dormancy wakeup messages, may be transmitted on some available common channels. This eliminates waiting for dedicated traffic channels to be re-established. Common channels may be always available, regardless of the state of the participating CDs, and may not require being requested and reassigned each time a group member initiates a group communication. Therefore, the group communication signaling messages may be exchanged even when the participating CDs are dormant. In one embodiment dedicated traffic channels for the inviter's CD and invitees'CDs may be re-established in parallel.

In one embodiment, a dormant inviter's CD may send an invite message to the wireless infrastructure over some available reverse common channel, such as reverse access channel and reverse enhanced access channel. The inviter's CD may also receive a response to the invite message on some available forward common channel, such as forward paging channel and forward common control channel. In one embodiment, dormant invitees'CDs may receive dormancy wakeup messages and/or invite messages on some available forward common channel, such as forward paging channel and forward common control channel.

Short Data Burst Call-Signaling Messages

In one embodiment, a significant reduction in dormancy wakeup time may be achieved through the use of short data burst (SDB) messages, as provided in "TIA/EIA/IS-2000 Standards for cdma2000 Spread Spectrum Systems," hereinafter referred to as "the cdma2000 standard." In one embodiment, SDB messages may be sent over a dedicated active channel, such as the forward fundamental channel (FCH) or forward dedicated common control channel (F-DCCH). SDB messages may also be sent over a common active channel, such as the reverse access channel (R-ACH), reverse enhanced access channel (R-EACH), forward common control channel (F-CCCH), or paging channel (PCH). SDB messages may be transported by radio burst protocol (RBP), which maps the messages onto an appropriate and available active layer channel. Because SDB messages may carry arbitrary IP traffic and may be sent over common active channels, SDB messages provide a mechanism to exchange group communication signaling when participating CDs have no available dedicated traffic channel.

In one embodiment, media-signaling messages may carry IP datagrams over the reverse link or mobile-originated link. An inviter's CD may signal the group communication server quickly whenever the inviter requests the floor and a dedicated reverse traffic channel is not immediately available. Assuming the inviter's CD has released all dedicated traffic channels, the inviter's CD may immediately forward the invite message over a reverse common channel of a wireless infrastructure, which may relay the invite message to the group communication server. For example, either the reverse access channel or the reverse enhanced access channel may be used to send such messages when a dedicated reverse channel is not available. In one embodiment, the inviter's CD may transmit an invite message to the group communication server as SDB messages.

Therefore, the disclosed embodiments provide for first inviting a group of target users for exchanging media. The inviter waits for at least one of the invitees to accept the invitation before starting the media communication, thereby the inviter correlates the system delay in setting up the communication session to the invitees, rather than to the system or the service provider.

Those of skill in the art would understand that information and signals may be represented using any of a variety of different technologies and protocols. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

The invention claimed is:

1. A method for establishing an invite-first communication session in a wireless communication network, the method comprising:
    receiving an invite message from an inviter;
    forwarding the invite message to one or more invitees on a common channel of a wireless network infrastructure without waiting for a dedicated traffic channel to be established for the one or more invitees, wherein the invite message indicates that an acceptance is required from the one or more invitees to establish a communication session;
    receiving the acceptance from at least one invitee in response to the invite message, wherein the at least one invitee selects to accept the invitation; and
    establishing the communication session between the inviter and the at least one invitee.

2. The method of claim 1, wherein said establishing the communication session includes establishing a half-duplex communication session.

3. The method of claim 1, wherein said receiving the invite message includes receiving the invite message on a common channel of a wireless network infrastructure.

4. The method of claim 1, wherein said invite message is in short data burst (SDB) format.

5. The method of claim 1, further including establishing a traffic channel before said receiving the invite message.

6. The method of claim 5, wherein said receiving the invite message includes receiving the invite message on the established traffic channel.

7. The method of claim 1, further including establishing a traffic channel for each of the one or more invitees before said forwarding the invite message.

8. The method of claim 7, wherein said forwarding the invite message includes forwarding the invite message on the established traffic channel for each of the one or more invitees.

9. The method of claim 1, wherein the invite message includes an expiration time for responding to the invite message.

10. The method of claim 9, wherein if the expiration time has expired before said receiving the acceptance, sending an indication to the at least one invitee accordingly, instead of said establishing the communication session.

11. A computer-readable medium comprising at least one instruction, which, when executed by a machine, causes the machine to perform operations, the instructions comprising:
    a set of the instructions to receive an invite message from an inviter;
    a set of the instructions to forward the invite message to one or more invitees on a common channel of a wireless network infrastructure without waiting for a dedicated traffic channel to be established for the one or more invitees, wherein the invite message indicates that an acceptance is required from the one or more invitees to establish a communication session;

a set of the instructions to receive the acceptance from at least one invitee in response to the invite message, wherein the at least one invitee selects to accept the invitation; and a set of the instructions to establish the communication session between the inviter and the at least one invitee.

12. The computer-readable medium of claim 11, wherein said set of instructions to establish the communication session includes a set of instructions to establish a half-duplex communication session.

13. The computer-readable medium of claim 11, wherein said set of instructions to receive the invite message includes a set of instructions to receive the invite message on a common channel of a wireless network infrastructure.

14. The computer-readable medium of claim 11, wherein said invite message is in short data burst (SDB) format.

15. The computer-readable medium of claim 11, further including a set of instructions to establish a traffic channel before said set of instructions to receive the invite message.

16. The computer-readable medium of claim 15, wherein said set of instructions to receive the invite message includes a set of instructions to receive the invite message on the established traffic channel.

17. The computer-readable medium of claim 11, further including establishing a traffic channel for each of the one or more invitees before said set of instructions to forward the invite message.

18. The computer-readable medium of claim 17, wherein said set of instructions to forward the invite message includes a set of instructions to forward the invite message on the established traffic channel for each of the one or more invitees.

19. The computer-readable medium of claim 11, further including a set of instructions wherein said invite message includes an expiration time to respond to the invite message.

20. The computer-readable medium of claim 19, wherein if the expiration time has expired before said set of instructions to receive the acceptance, a set of instructions to send an indication to the at least one invitee accordingly, instead of said set of instructions to establish the communication session.

21. A server for establishing an invite-first communication session in a wireless communication network, comprising:
means for receiving an invite message from an inviter;
means for forwarding the invite message to one or more invitees on a common channel of a wireless network infrastructure without waiting for a dedicated traffic channel to be established for the one or more invitees, wherein the invite message indicates that an acceptance is required from the one or more invitees to establish a communication session;
means for receiving the acceptance from at least one invitee in response to the invite message, wherein the at least one invitee selects to accept the invitation; and
means for establishing the communication session between the inviter and the at least one invitee.

22. The server of claim 21, wherein said means for establishing the communication session includes means for establishing a half-duplex communication session.

23. The server of claim 21, wherein said means for receiving includes means for receiving the invite message the invite message on a common channel of a wireless network infrastructure.

24. The server of claim 21, wherein said invite message is in short data burst (SDB) format.

25. The server of claim 21, further including means for establishing a traffic channel before said receiving the invite message.

26. The server of claim 25, wherein said means for receiving the invite message includes means for receiving the invite message on the established traffic channel.

27. The server of claim 21, further including means for establishing a traffic channel for each of the one or more invitees before said forwarding the invite message.

28. The server of claim 27, wherein said means for forwarding the invite message includes means for forwarding the invite message on the established traffic channel for each of the one or more invitees.

29. The server of claim 21, wherein said invite message includes an expiration time for responding to the invite message.

30. The server of claim 29, wherein if the expiration time has expired before said receiving the acceptance, further including means for sending an indication to the at least one invitee accordingly, instead of said establishing the communication session.

31. A server for establishing an invite-first communication session in a wireless communication network, comprising:
a memory unit;
a receiver;
a transmitter; and
a processor coupled to the memory unit, the receiver, and the transmitter, the processor being capable of:
receiving an invite message from an inviter;
forwarding the invite message to one or more invitees on a common channel of a wireless network infrastructure without waiting for a dedicated traffic channel to be established for the one or more invitees, wherein the invite message indicates that an acceptance is required from the one or more invitees to establish a communication session;
receiving the acceptance from at least one invitee in response to the invite message, wherein the at least one invitee selects to accept the invitation; and
establishing the communication session between the inviter and the at least one invitee.

32. The server of claim 31, wherein said establishing the communication session includes establishing a half-duplex communication session.

33. The server of claim 31, wherein said receiving the invite message includes receiving the invite message on a common channel of a wireless network infrastructure.

34. The server of claim 31, wherein said invite message is in short data burst (SDB) format.

35. The server of claim 31, further including establishing a traffic channel before said receiving the invite message.

36. The server of claim 35, wherein said receiving the invite message includes receiving the invite message on the established traffic channel.

37. The server of claim 31, further including establishing a traffic channel for each of the one or more invitees before said forwarding the invite message.

38. The server of claim 37, wherein said forwarding the invite message includes forwarding the invite message on the established traffic channel for each of the one or more invitees.

39. The server of claim 31, wherein said invite message includes an expiration time for responding to the invite message.

40. The server of claim 39, wherein if the expiration time has expired before said receiving the acceptance, sending an indication to the at least one invitee accordingly, instead of said establishing the communication session.

41. A method for placing an invite-first communication session in a wireless communication network, the method comprising:
receiving an input from an inviter to invite one or more invitees with a required acceptance indication;
forwarding an invite message to the one or more invitees, wherein the invite message indicates that an acceptance is required from the one or more invitees, wherein a server forwards the invite message to the one or more invitees on a common channel of a wireless network infrastructure without waiting for a dedicated traffic channel to be established for the one or more invitees;
receiving an announcement from at least one invitee in response to the invite message, wherein the at least one invitee selected to accept the invitation;
sending an alert to the inviter that an invitee accepted the invitation; and
establishing a communication session between the inviter and the at least one invitee.

42. The method of claim 41, wherein said establishing the communication session includes establishing a half-duplex communication session.

43. The method of claim 41, wherein said forwarding includes forwarding the invite message on a common channel of a wireless network infrastructure.

44. The method of claim 41, wherein said invite message is in short data burst (SDB) format.

45. The method of claim 41, further including establishing a traffic channel before said forwarding the invite message.

46. The method of claim 45, wherein said forwarding the invite message includes forwarding the invite message on the established traffic channel.

47. The method of claim 41, wherein said invite message includes an expiration time for responding to the invite message.

48. The method of claim 47, wherein if the expiration time has expired before said receiving the announcement, sending an indication to the at least one invitee accordingly, instead of said establishing the communication session.

49. A computer-readable medium comprising at least one instruction, which, when executed by a machine, causes the machine to perform operations, the instructions comprising:
a set of the instructions to receive an input from an inviter to invite one or more invitees with a required acceptance indication;
a set of the instructions to forward an invite message to the one or more invitees, wherein the invite message indicates that an acceptance is required from the one or more invitees, wherein a server forwards the invite message to the one or more invitees on a common channel of a wireless network infrastructure without waiting for a dedicated traffic channel to be established for the one or more invitees;
a set of the instructions to receive an announcement from at least one invitee in response to the invite message, wherein the at least one invitee selected to accept the invitation;
sending an alert to the inviter that an invitee accepted the invitation; and
a set of the instructions to establish a communication session between the inviter and the at least one invitee.

50. The computer-readable medium of claim 49, wherein said set of instructions to establish the communication session includes a set of instructions to establish a half-duplex communication session.

51. The computer-readable medium of claim 49, wherein said set of instructions to forward includes a set of instructions to forward the invite message on a common channel of a wireless network infrastructure.

52. The computer-readable medium of claim 49, wherein said invite message is in short data burst (SDB) format.

53. The computer-readable medium of claim 49, further including a set of instructions to establish a traffic channel before said set of instructions to forward the invite message.

54. The computer-readable medium of claim 53, wherein said set of instructions to forward the invite message includes a set of instructions to forward the invite message on the established traffic channel.

55. The computer-readable medium of claim 49, further including a set of instructions wherein said invite message includes an expiration time to respond to the invite message.

56. The computer-readable medium of claim 55, wherein if the expiration time has expired before said set of instructions to receive the announcement, a set of instructions to send an indication to the at least one invitee accordingly, instead of said set of instructions to establish the communication session.

57. A communication device for placing an invite-first communication session in a wireless communication network, comprising:
means for receiving an input from an inviter to invite one or more invitees with a required acceptance indication;
means for forwarding an invite message to the one or more invitees, wherein the invite message indicates that an acceptance is required from the one or more invitees, wherein a server forwards the invite message to the one or more invitees on a common channel of a wireless network infrastructure without waiting for a dedicated traffic channel to be established for the one or more invitees;
means for receiving an announcement from at least one invitee in response to the invite message, wherein the at least one invitee selected to accept the invitation;
means for sending an alert to the inviter that an invitee accepted the invitation; and
means for establishing a communication session between the inviter and the at least one invitee.

58. The communication device of claim 57, wherein said means for establishing the communication session includes means for establishing a half-duplex communication session.

59. The communication device of claim 57, wherein said means for forwarding includes means for forwarding the invite message on a common channel of a wireless network infrastructure.

60. The communication device of claim 57, wherein said invite message is in short data burst (SDB) format.

61. The communication device of claim 57, further including means for establishing a traffic channel before said forwarding the invite message.

62. The communication device of claim 61, wherein said means for forwarding the invite message includes means for forwarding the invite message on the established traffic channel.

63. The communication device of claim 57, wherein said invite message includes an expiration time for responding to the invite message.

64. The communication device of claim 63, wherein if the expiration time has expired before said receiving the announcement, further including means for sending an indication to the at least one invitee accordingly, instead of said establishing the communication session.

65. A communication device for placing an invite-first communication session in a wireless communication network, comprising:
a memory unit;
a receiver;
a transmitter; and
a processor coupled to the memory unit, the receiver, and the transmitter, the processor being capable of:
receiving an input from an inviter to invite one or more invitees with a required acceptance indication;
forwarding an invite message to the one or more invitees, wherein the invite message indicates that an acceptance is required from the one or more invitees, wherein a server forwards the invite message to the one or more invitees on a common channel of a wireless network infrastructure without waiting for a dedicated traffic channel to be established for the one or more invitees;
receiving an announcement from at least one invitee in response to the invite message, wherein the at least one invitee selected to accept the invitation;
sending an alert to the inviter that an invitee accepted the invitation; and
establishing a communication session between the inviter and the at least one invitee.

66. The communication device of claim 65, wherein said establishing the communication session includes establishing a half-duplex communication session.

67. The communication device of claim 65, wherein said forwarding includes forwarding the invite message on a common channel of a wireless network infrastructure.

68. The communication device of claim 65, wherein said invite message is in short data burst (SDB) format.

69. The communication device of claim 65, further including establishing a traffic channel before said forwarding the invite message.

70. The communication device of claim 69, wherein said forwarding the invite message includes forwarding the invite message on the established traffic channel.

71. The communication device of claim 65, wherein said invite message includes an expiration time for responding to the invite message.

72. The communication device of claim 71, wherein if the expiration time has expired before said receiving the announcement, sending an indication to the at least one invitee accordingly, instead of said establishing the communication session.

* * * * *